United States Patent
Logan, Jr. et al.

(10) Patent No.: US 6,490,071 B2
(45) Date of Patent: *Dec. 3, 2002

(54) METHOD AND APPARATUS FOR OPTIMIZING SBS PERFORMANCE IN AN OPTICAL COMMUNICATION SYSTEM USING AT LEAST TWO PHASE MODULATION TONES

(75) Inventors: Ronald T. Logan, Jr., Newtown, PA (US); Ruo Ding Li, North Wales, PA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/923,029

(22) Filed: Aug. 6, 2001

(65) Prior Publication Data

US 2002/0015208 A1 Feb. 7, 2002

Related U.S. Application Data

(63) Continuation of application No. 09/017,182, filed on Feb. 2, 1998, now Pat. No. 6,282,003.

(51) Int. Cl.[7] .................. H04B 10/00; H04B 10/12; H04B 10/04
(52) U.S. Cl. ............. 359/161; 359/173; 359/183; 359/187; 359/188
(58) Field of Search .................. 359/161, 173, 359/183, 188, 187

(56) References Cited

U.S. PATENT DOCUMENTS

| | | | |
|---|---|---|---|
| 4,560,246 A | | 12/1985 | Cotter ................. 350/96.16 |
| 5,420,868 A | * | 5/1995 | Chraplyvy et al. ......... 370/122 |
| 5,515,196 A | * | 5/1996 | Kitajima et al. ........... 359/180 |
| 5,566,381 A | * | 10/1996 | Korotky ................. 359/183 |
| 5,828,477 A | * | 10/1998 | Nilsson et al. ............ 359/181 |

(List continued on next page.)

OTHER PUBLICATIONS

E. P. Ippen, Laser Application to Optics and Spectroscopy, Jul. 1973 conference in Crystal Mountain, Washington held by University of Arizona, Chapter 6, Nonlinear Effects in Optical Fibers, pp. 213–244, 1975.

(List continued on next page.)

Primary Examiner—Leslie Pascal
Assistant Examiner—M. R. Sedighian
(74) Attorney, Agent, or Firm—Allen, Dyer, Doppelt, Milbrath & Gilchrist, P.A.

(57) ABSTRACT

A method of optimizing SBS suppression is disclosed for use in an optical communication system including a light guide for transmitting light and means for producing phase modulation of the light using at least first and second tones. In the method, an operational region of SBS suppression is established as a function of the phase modulation of the light such that the operational region identifies combinations of first and second phase modulation levels at which optimum SBS suppression is achieved for the first and second tones. Thereafter, based on the operational region, the first and second phase modulation levels are adjusted such that the system operates with optimum SBS suppression. In one aspect, a contour map and associated method are introduced. The contour map is especially suited for use in optimizing SBS suppression in an optical communication system in which light is phase modulated using at least first and second tones for transmission of the phase modulated light via media which exhibits an SBS threshold. In another aspect, one of the sub-regions identified by the contour map may be selected as the operating point of the system based on certain characteristics of the contour map at and around the location of the selected operating point. In this manner, for example, the stability of the optical communication system may be improved in the event that the selected operating point is subject to drift.

35 Claims, 5 Drawing Sheets

U.S. PATENT DOCUMENTS

| | | | | |
|---|---|---|---|---|
| 5,910,852 A | * | 6/1999 | Fontana et al. | 359/156 |
| 5,917,179 A | * | 6/1999 | Yao | 250/227.11 |
| 5,930,024 A | * | 7/1999 | Atlas | 359/279 |
| 5,953,139 A | * | 9/1999 | Nemecek et al. | 359/124 |
| 6,204,951 B1 | * | 3/2001 | Coward et al. | 359/245 |
| 6,282,003 B1 | * | 8/2001 | Logan et al. | 359/161 |

OTHER PUBLICATIONS

E.P. Ippen and R.H. Stolen, Stimulated Brillouin scattering in optic fibers, Dec. 1972, Appl. Phys. Lett., vol. 21. No. 11, pp. 539–541.

* cited by examiner $V_\alpha$ (2 GHz) = 6V
$V_\alpha$ (6 GHz) = 10V

METHOD AND APPARATUS FOR OPTIMIZING SBS PERFORMANCE IN AN OPTICAL COMMUNICATION SYSTEM USING AT LEAST TWO PHASE MODULATION TONES

This is a Continuation application of prior application Ser. No. 09/017,182, filed on Feb. 2, 1998, U.S. Pat. No. 6,282,003 the disclosures of which are incorporated herein by reference.

The present invention is related generally to the phenomenon of Stimulated Brillouin Scattering (hereinafter SBS) in the light guide of an optical communication system and more particularly to a method and associated apparatus for optimizing the SBS performance of such an optical communication system by using at least two phase modulation tones and identifying an advantageous operational region based on the phase modulation provided by the tones. A highly advantageous SBS contour map and its method of use are also disclosed. In addition, a modulated light producing arrangement manufactured in accordance with the teachings of the present invention is disclosed.

The phenomenon of SBS has been known in the prior art for a number of years. Essentially, SBS results when a threshold power level is exceeded within a sufficiently narrow frequency band in a fiber optic light guide. The problem of SBS has become significant with the development of lasers such as, for example, Single Longitudinal Mode lasers which readily provide an output that exceeds the SBS threshold (typically about 4 mW in, for example, a 50 kilometer fiber optic cable). Moreover, limitation of optical power to a level as low as 4 mW not only fails to utilize the output power available from state of the art lasers, but limits distance transmission through fiber optic cable by an unacceptable margin. Therefore, suppression of SBS has been contemplated in the prior art.

One effective method of overcoming the limitations imposed by SBS has been found to be the use of phase modulation. U.S. Pat. No. 4,560,246 broadly describes this technique. Indeed, the utilization of two modulation tones, specifically 2 and 6 GHz tones, to achieve the desired phase modulation is admitted prior art. In fact, as early as 1975, E. P. Ippen recognized in an article entitled Nonlinear Effects in Optical Fibers that SBS is a limitation on narrow band transmission capabilities, and low SBS threshold can, in practice, be circumvented by the use of short pulses or broad band sources. However, as will be described below, the present invention recognizes a highly advantageous and heretofore unknown method of improving SBS performance for use with at least two phase modulation sources. The method may utilize a highly advantageous phase modulation contour map for the purpose of establishing certain operating parameters of an optical communication system. In addition, a light producing arrangement is disclosed which provides for implementation of the established operating parameters.

SUMMARY OF THE INVENTION

As will be described in more detail hereinafter, a method of optimizing SBS suppression is disclosed for use in an optical communication system including a light guide for transmitting light and means for producing phase modulation of the light using at least first and second tones. In the method, an operational region of SBS suppression is established as a function of the phase modulation of the light such that the operational region identifies combinations of first and second phase modulation levels at which optimum SBS suppression is achieved for the first and second tones. Thereafter, based on the operational region, the first and second phase modulation levels are adjusted such that the system operates with optimum SBS suppression.

In one aspect of the present invention, a contour map and associated method are introduced. The contour map is especially suited for use in optimizing SBS suppression in an optical communication system in which light is phase modulated using at least first and second tones for transmission of the phase modulated light via media which exhibits an SBS threshold. The contour map includes a first axis along which the phase modulation value produced by the first tone is plotted and a second axis along which the phase modulation value produced by the second tone is plotted. An SBS suppression value is assigned to each point within a region defined by the phase modulation values produced by the first and second tones such that sub-regions of SBS suppression are identifiable with the region.

In another aspect of the present invention, one of the sub-regions identified by the foregoing contour map may be selected as the operating point of the system based on certain characteristics of the contour map at and around the location of the selected operating point. In this manner, the stability of the optical communication system may be improved, for example, in the event that the selected operating point is subject to drift.

In yet another aspect of the present invention, a light producing arrangement for injecting light into a light guide which exhibits SBS is disclosed. The arrangement includes means for generating light and means for phase modulating the generated light for the purpose of suppressing SBS. The phase modulating means includes at least first and second tone generators, having first and second adjustable output power levels, respectively, which are adjustable in increments of less than 0.5 dBm.

In still another aspect of the present invention, a tone generator is provided which includes a feedback loop so as to substantially stabilize the output of the tone generator for use in phase modulating the light output of a laser.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
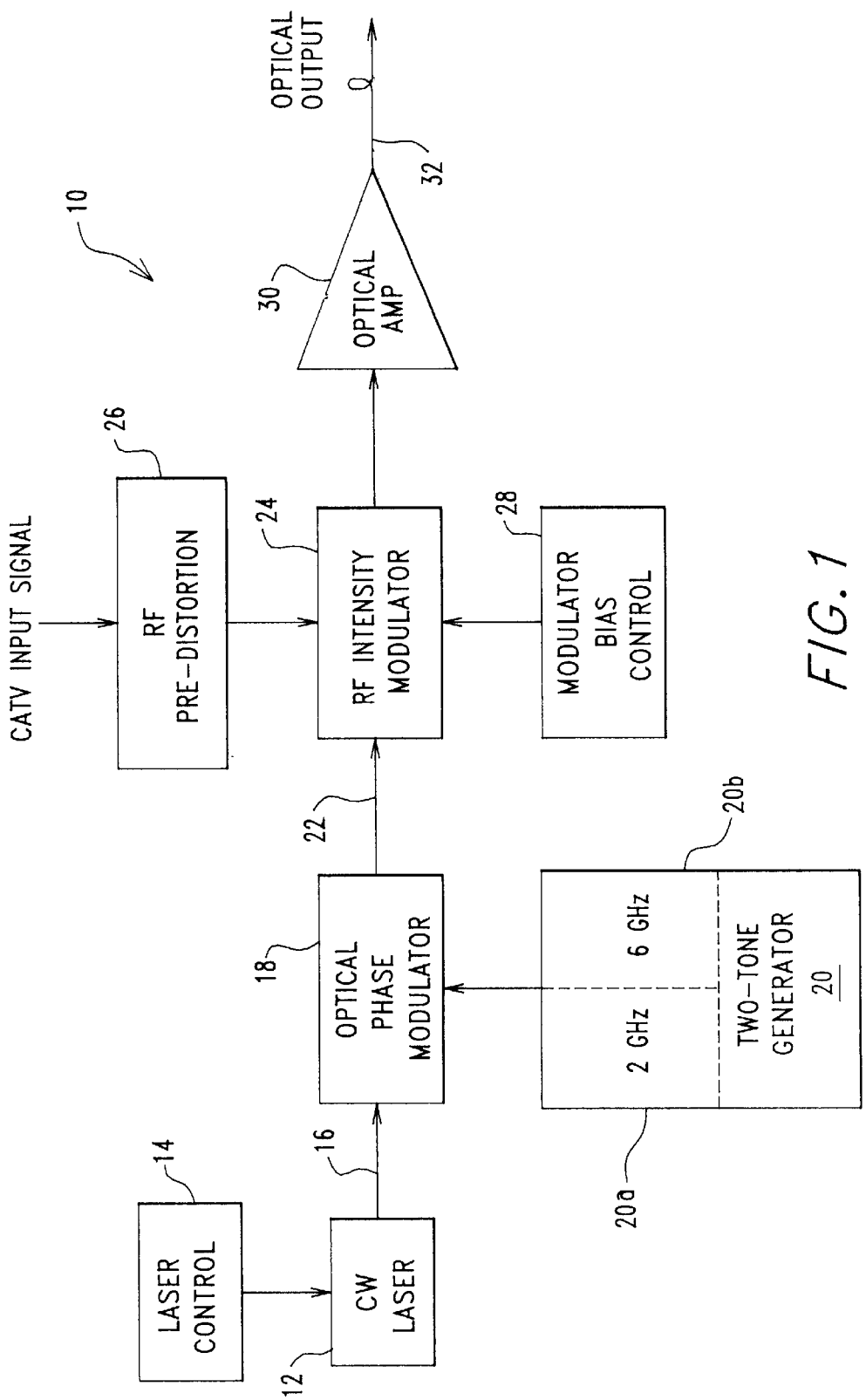
FIG. 1 is a block diagram illustrating an optical communication system designed in accordance with the present invention.

Attention is immediately directed to FIG. 1, which diagrammatically illustrates an optical communication system designed in accordance with the present invention and generally indicated by the reference numeral 10. System 10 includes a continuous wave (hereinafter CW) laser 12 of any suitable type including but not limited to semiconductor distributed feedback, solid state and fiber lasers. CW laser 12 is controlled by a laser control unit 14 which compensates, as an example, for variations in laser power and ambient temperature. CW laser 12 preferably outputs a single longitudinal mode having a predetermined wavelength onto a fiber optic cable 16 which is, in turn, connected with an optical phase modulator 18. The latter may employ, for example, a lithium niobate crystal which is not shown for purposes of simplicity. With appropriate electrical stimulation such a lithium niobate crystal is capable of modulating a beam of light which is passing through the crystal. Electrical stimulation is provided to the crystal in phase modulator 18 by a two-tone generator 20. For the moment, it is sufficient to note that two-tone generator 20 includes a 2 GHz tone generator 20a and a 6 GHz tone generator 20b. Detailed descriptions of several highly advantageous embodiments of generator 20 will be provided at appropriate points hereinafter.

Still referring to FIG. 1, the output of optical phase modulator 18 is provided via an optical cable 22 to an RF intensity modulator 24. At the same time, an input signal is provided to an RF pre-distortion module 26. In this instance, the input signal is a CATV signal, however, it is to be understood that any suitable input signal may be used including but not limited to analog and digital signals. Pre-distortion module 26 performs linearization functions on the CATV input signal and, thereafter, provides a conditioned CATV input signal to RF intensity modulator 24. A modulator bias control 28 is also connected with the RF intensity modulator so as to enable amplitude modulation control of the conditioned CATV input signal onto the phase modulated signal which is received from optical phase modulator 18. Thereafter, a phase and amplitude modulated optical signal is provided by the RF intensity modulator to an optical amplifier 30 which, in turn, drives an optical fiber 32 having a length in the range of approximately 40 kilometers to 65 kilometers. Fiber 32 typically exhibits an SBS threshold of approximately 4 milliwatts. In this regard, it should be appreciated that the present invention contemplates the use of any suitable optical light guide which exhibits SBS, either currently available or to be developed. Fiber 32 is terminated by an optical receiver which is not illustrated for purposes of simplicity.

Figure 2:
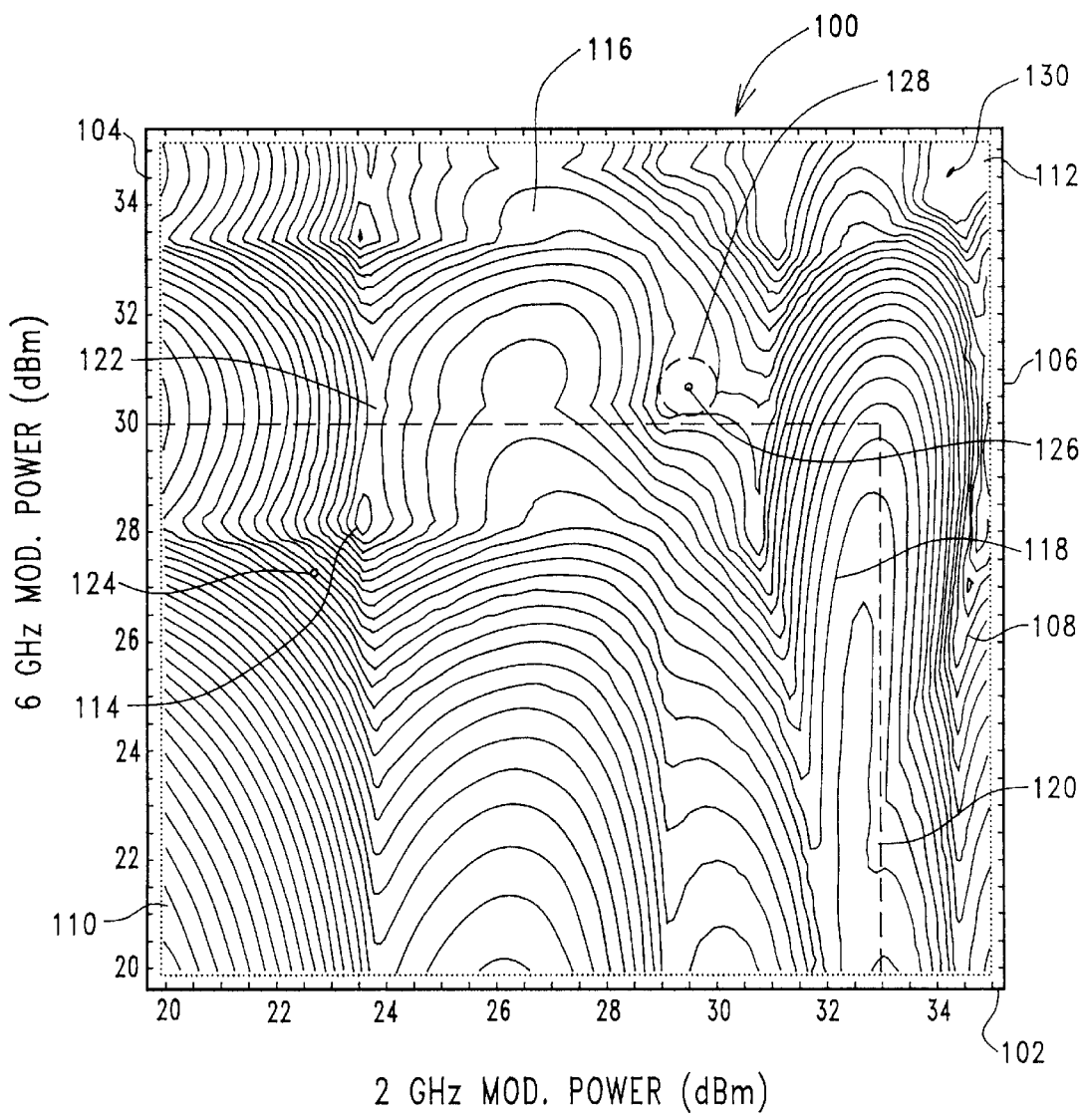
FIG. 2 is graphic, monochrome representation of a contour map produced in accordance with the method of the present invention for use in establishing a modulation operating point for the optical communication system depicted in FIG. 1.

Having provided a general description of the components which make up system 10, attention is now directed to FIG. 2 in conjunction with FIG. 1. FIG. 2 illustrates a modulation contour map generally indicated by the reference numeral 100 and developed in accordance with the method of the present invention, which method will be described at an appropriate point below. As will be seen, modulation contour map 100 is highly advantageous with regard to understanding the operation of system 10 in terms of the amount of phase modulation provided at the frequencies of tone generators 20a and 20b.

Still referring to FIGS. 1 and 2, modulation contour map 100 includes a horizontal axis 102 along which the phase modulation provided by 2 GHz tone generator 20a is plotted in terms of the output power of the generator as measured in dBm (decibels referenced to 1 milliwatt). Similarly, modulation contour map 100 includes a vertical axis 104 along which the phase modulation provided by 6 GHz tone generator 20b is plotted in terms of its output power as measured in dBm. It should be appreciated that each tone generator provides a predetermined, known phase shift based on its input power to phase modulator 18. Therefore, the scale on either axis could just as readily be indicated as phase modulation in radians, as opposed to tone generator output power. Alternatively, both phase modulation and tone generator output power may be indicated along the axes of modulation contour map 100.

Axes 102 and 104 of modulation contour map 100 define a region of operation 106 for system 10. Region 106 includes a plurality of SBS threshold levels 108 wherein each successive level represents a change in SBS threshold of 0.2 dB. One of ordinary skill in the art will appreciate that the SBS threshold level determines the maximum amount of power which may be transmitted down fiber optic member 32 without encountering the SBS phenomenon. Thus, it is desirable to operate at the highest possible SBS threshold level whereby power transmitted down the member may be maximized. It is noted that contour map 100 is a monochromatic representation of an actual color map which was produced in accordance with the present invention. The use of color in such contour maps is an effective technique for purposes of indicating the relative SBS threshold values of the various levels within the map. For example, the highest SBS threshold values may be indicated in red while the lowest values may be indicated in blue. In this manner, one is able to readily distinguish high values on top of "peaks" from low values within "valleys". Because the present forum does not afford the luxury of illustrating contour map 100 in a color format, details regarding its "topography" will be provided immediately hereinafter.

Referring solely to FIG. 2, the lowest SBS thresholds of map 100 lie within a region 110 which is immediately adjacent the origin of the map. The highest SBS thresholds of the map lie within a region 112 at the upper right corner of the map. The difference in the SBS threshold between regions 110 and 112 is approximately 8 dB or a factor of approximately 6.3. An SBS threshold peak 114 is indicated within region 106. Peak 114 is approximately 2.2 dB dow from high SBS threshold region 112. It is also of interest to note that a number of relatively broad plateaus are present within region 106 such as, for example, a plateau 116 which is approximately 2 dB down from high SBS threshold region 112. The significance of these various features within region 106 will become more apparent within the context of the discussions which follow.

Having generally described the features of contour map 100 of the present invention, a description will now be provided with regard to the way in which the contour map may be used to select an operating point for system 10. As mentioned above, several embodiments of tone generator 20 will be described herein. State of the art 2 GHz and 6 GHz tone generators are capable of providing adjustable output power up to approximately 33 and 30 dBm, respectively. Therefore, as can be seen from FIG. 2, the tone generators limit the region in which system 10 may operate to only a portion 118 of region 106 as indicated within dashed lines 120. Removal of this operational constraint will be considered at an appropriate point below. It should be noted that tone generators 20a and 20b may be implemented by one having ordinary skill in the art. It is evident from the extent of portion 118 that high SBS region 112 is inaccessible using tone generators 20a and 20b. However, SBS peak 114 lies within portion 118 along with part of plateau 116.

It should be appreciated that prior to the development of the contour map of the present invention, appropriate output powers for tone generators 20a and 20b of two-tone generator 20 were established empirically. That is, the operating point was selected based on laboratory measurements. However, difficulties were encountered with regard to the sensitivity of systems to these adjustments. One difficulty resided in establishing the operating point using initial adjustments. Another difficulty related to an unacceptable number of instances where systems required re-adjustment at some point in time after the initial adjustments were performed. The reasons for these difficulties remained unknown. Based on new found knowledge, the present invention offers the ability to resolve these problems in a highly effective, yet straight forward manner, as will be seen. Moreover, the present invention contemplates the development of systems having a level of stability which has not previously been thought possible.

Referring again to FIG. 2, it has been discovered that the prior art "target" of the output power adjustments for the tone generators was, in fact, previously unknown SBS peak 114. The latter lies at power outputs of approximately 23.75 dBm for the 2 GHz generator and 28.25 dBm for the 6 GHz tone generator. It can be seen that peak 114 reside the end of a ridge 122. More importantly, it can also be seen that below and to the left of peak 114, the SBS threshold drops off in a very rapid manner. In fact, according to the figure, a drop in power output of 1 dBm from the level of peak 114 for each tone generator places the system at an operating point 124 which is nearly 2 dB in SBS threshold down from peak 114 or a factor of approximately 1.6. Thus, operating at peak 114 as compared with at point 124 results in a 60 percent increase in the amount of power which may be transmitted down a fiber optic light guide. Moreover, prior difficulties encountered in performing adjustment of tone generator power level output are now well understood in light fi of the present invention, as will be discussed immediately hereinafter.

Previously, power output was adjusted, for example, by using 0.5 dB attenuators. However, the FIG. 2 demonstrates that peak 114 is very narrow laterally (less than 0.5 dB in width). Therefore, using a 0.5 dB attenuator one could readily jump across the peak rather than centering the adjustment on the peak. The narrowness of peak 114 also serves to explain the aforementioned problem of systems requiring re-adjustment. In this regard, it should be appreciated that even a slight drift in the output power of a tone generator may result in a relatively large change in SBS threshold when a system is initially adjusted for operation on peak 114. In view of this new information, tone generators have been developed for use in this application having significantly more stable power outputs which are adjustable in increments of less than 0.5 dB, as will be described at an appropriate point below. Using these new tone generators, adjustment of output power may be performed such that system 10 operates in a stable manner on peak 114.

Still referring to FIG. 2 and in view of the foregoing discussion, one of ordinary skill in the art will appreciate that the operational stability of system 10 is determined based, at least in part, on the topography surrounding the operating point of the system. More specifically, operating points centered within relatively broad features of the map will inherently be more tolerant to drift of the operating point, thus providing a more stable SBS threshold. Therefore, due to the fact that peak 114 is a particularly sharp feature on the map, it is submitted that other operating points may prove to be more advantageous. For example, an operating point 126 within previously mentioned plateau 116 may prove to be advantageous. Operating point 126 is at approximately 30 dBm at 2 GHz and 31 dBm at 6 GHz. In fact has an SBS threshold which is 0.2 dB above peak 114.

According to contour map 100, operation at point 126 provides a highly advantageous improvement in the stability of the SBS threshold since a drift in tone generator output power of 0.5 dBm, within a dashed circle 128, in any direction from point 126 results in no change in the SBS threshold. For this reason alone, it is submitted that the contour map of the present invention is highly advantageous. It should be mentioned that contour maps may readily be developed based upon tone generators which operate at frequencies other than those described herein. In this regard, the present invention remains applicable in future systems which may utilize other tones, for example, due to the need for higher data bandwidth. Moreover, three or more tones may be utilized in conjunction with a software implementation of the method of the present invention for purposes of identifying optimun operating points. It is noted that other concerns may arise as the spectrum of the optical signal is broadened. In fact, such concerns may be relevant even with the use of two tones at high levels of phase modulation. For example, one phenomenon of concern is that of frequency dispersion. The latter should be considered and managed appropriately if spectral broadening is to be employed on long distance fiber runs.

Having described the way in which the contour map of the present invention is used, one method of generating the contour map will now be described. Generally, the electric field intensity can be written as:

$$E = E_0 e^{j\omega_0 1 + j\phi}, \tag{1}$$

where $E_0$ is the amplitude, $\omega_0$ is the frequncy of the optic carrier and $\phi$ is the phase. For two tone phase modulation at frequencies $\Omega_1$ and $\Omega_2$:

$$\phi = \beta_1 \sin \Omega_1 t + \beta_2 \sin \Omega_2 t, \tag{2}$$

where $\beta_1$ and $\beta_2$ are the modulation indexes at frequencies $\Omega_1$ and $\Omega_2$, respectively. Using Equations 1 and 2, the electric field can be written as:

$$E = E_0 e^{j\omega_0 t} \cdot e^{j\beta_1 \sin \Omega_1 t} \cdot e^{j\beta_2 \sin \Omega_2 t} \tag{3}$$

By using Bessel expansions on the terms $e^{j\beta_1 \sin \Omega_1 t}$ and $e^{j\beta_2 \sin \Omega_2 t}$ we obtain:

$$E = E_0 e^{j\omega_0 t} \sum_{n=-\infty}^{+\infty} \sum_{k=-\infty}^{+\infty} J_n(\beta_1) J_k(\beta_2) e^{j(n\Omega_1 + k\Omega_2)t} \tag{4}$$

where $J_n(\beta_1)$ and $J_k(\beta_2)$ are Bessel functions of order n and k, respectively. If we now choose, for example, $\Omega_2 = 3_{\Omega_1}$, Equation 4 can be written as:

$$E = E_0 e^{j\omega_0 t} \sum_{m=-\infty}^{+\infty} \left[ \sum_{k=-\infty}^{+\infty} J_{m-3k}(\beta_1) J_k(\beta_2) \right] e^{jm\Omega_1 t}, \tag{5}$$

where n from Equation 4 is chosen to be n=m-k. The normalized optical intensity is defined as:

$$I = \frac{|E|^2}{|E_0|^2} \tag{6}$$

At an offset from carrier frequency $\omega_0$ of $m\Omega_1$. Using Equation 5:

$$I_m = \sum_{k=-\infty}^{+\infty} J_{m-3k}^2(\beta_1) J_k^2(\beta_2), \quad (7)$$

where m can take integer values from $-\infty$ to $+\infty$. The SBS suppression is determined by the maximum value of $I^m$ which occurs for one value of m, depending on the values of $\beta_1$ and $\beta_2$. For example, at small values of $\beta_1$, $\beta_2 \ll 1$, the maximum value of $I_m$ occurs at m=0. As $\beta_1$ and $\beta_2$ increase, the maximum value of $I_m$ will move from m=0 to m=1 and further move to m=2 and to other, higher values of m. In the present circumstances with n=m-3k, Bessel functions $J_n(\beta_1)$ and $J_k(\beta_2)$ for n and k greater than 10, have a very small value and, thus, may be ignored. Therefore, $I_m$ is calculated by limiting k and n=m-3k to the range of −10 to +10 since this range has been found to yield sufficient accuracy. Moreover, $I_m$ is symmetric with respect to m around m=0, i.e., $I_m = I_{-m}$. Thus, to find the maximum $I_m$, we need only consider m=0 to 10. When the maximum value, $I_{m,MAX}$ is found, the SBS supression in decibels is given as:

$$S = -10 \log_{10} I_{m,MAX} [dB] \quad (8)$$

The numerical process used to produce contour plot 100 includes calculating $I^m$ for m=0 to 10 for given values of $\beta_1$ and $\beta_2$ using Equation 7 where k and m−3k range from −10 to +10. The values of $I_m$ for m=0 to 10 are then compared to find the maximum value which becomes $I_{m,MAX}$. The log value is then plotted using Equation 8.

Turning again to FIG. 2, irrespective of the limitations imposed by the phase modulation capabilities of system 10, the optimum operating point for the system would reside at the upper right hand corner of contour map 100, for example, at an operating point 130. The latter includes an SBS threshold that is 1.8 dB higher than the threshold at plateau 116 which would result in an increase in power down an optical fiber of approximately 1.5, a level which is 50% more power than that which is available at plateau 116. Presently, operating point 130 is beyond the modulation capabilities of commercially practical systems. Alternatively, operating point 126 is out of the power range of current 6 GHz tone generators by approximately 0.5 dB, but is, however, within the range of current 2 GHz tone generators. Therefore, it is suggested that, with the development of an appropriate 6 GHz tone generator, operating point 126 may serve as an interim operating point using a modified modulation arrangement prior to operating at point 130. However, it is contemplated that hardware having modulation capabilities placing region 112 within reach will be implemented, particularly in view of the teachings herein. The effect of the development of such a new modulator arrangement on the modulation contour map of the present invention will be described immediately hereinafter.

Figure 3:
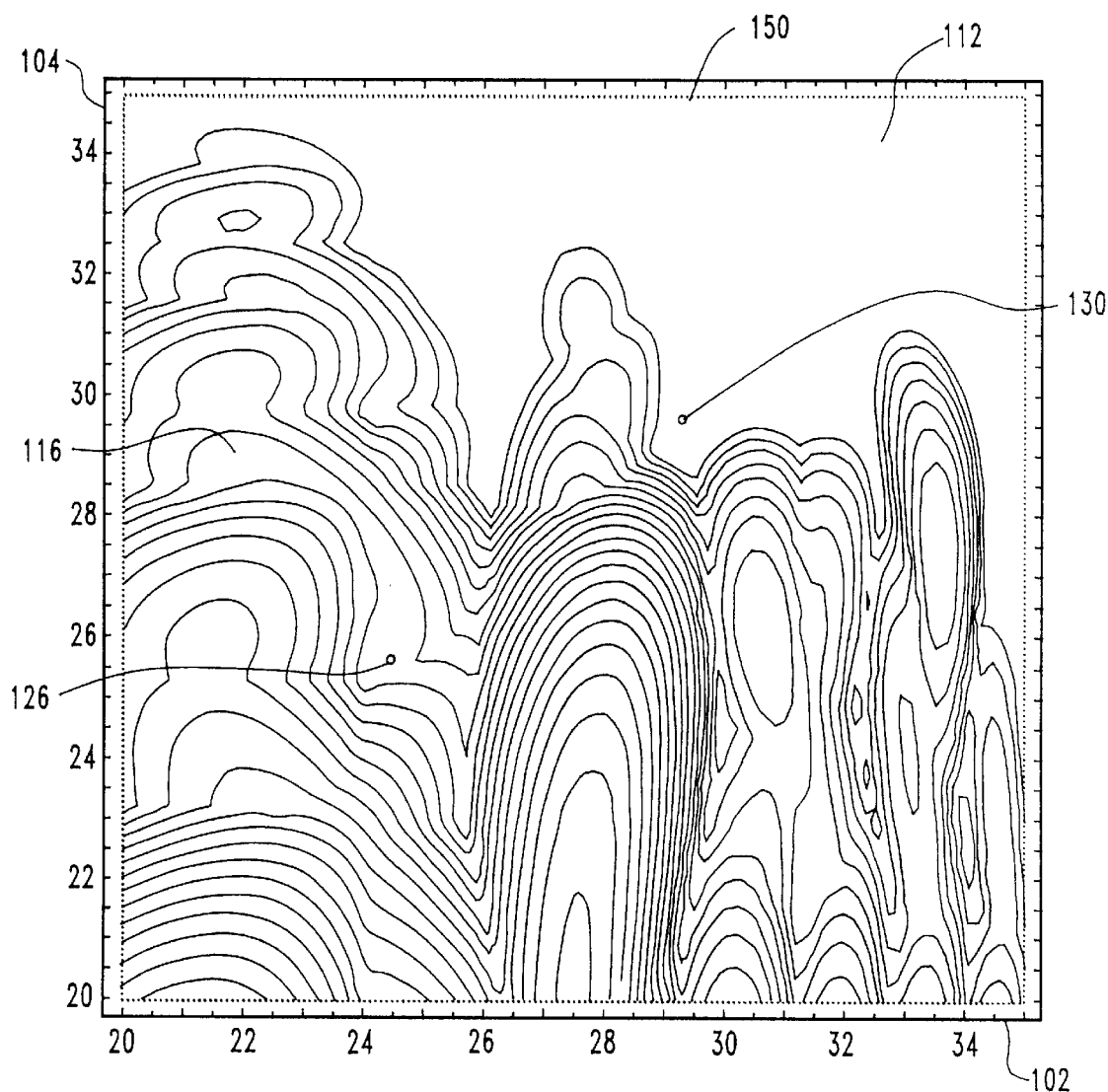
FIG. 3 is modified version of the contour map of FIG. 2 shown here to illustrate the effects of advancing the phase modulation as compared with FIG. 2.

Turning to FIGS. 2 and 3, a contour map 150 is shown which contemplates the development of a modulator arrangement (not shown) that provides significantly higher modulation levels than state of the art modulator arrangements. The effect of the higher modulation levels would essentially be to shift the features of modulation contour map 100 downward and to the left. As points of reference, plateau 116 and operating point 126 are denoted in modulation contour map 126. The calculation algorithm was terminated for values in region 112. Even higher levels of SBS suppression exist beyond this region, but are not shown here for purposes of clarity.

Figure 4:
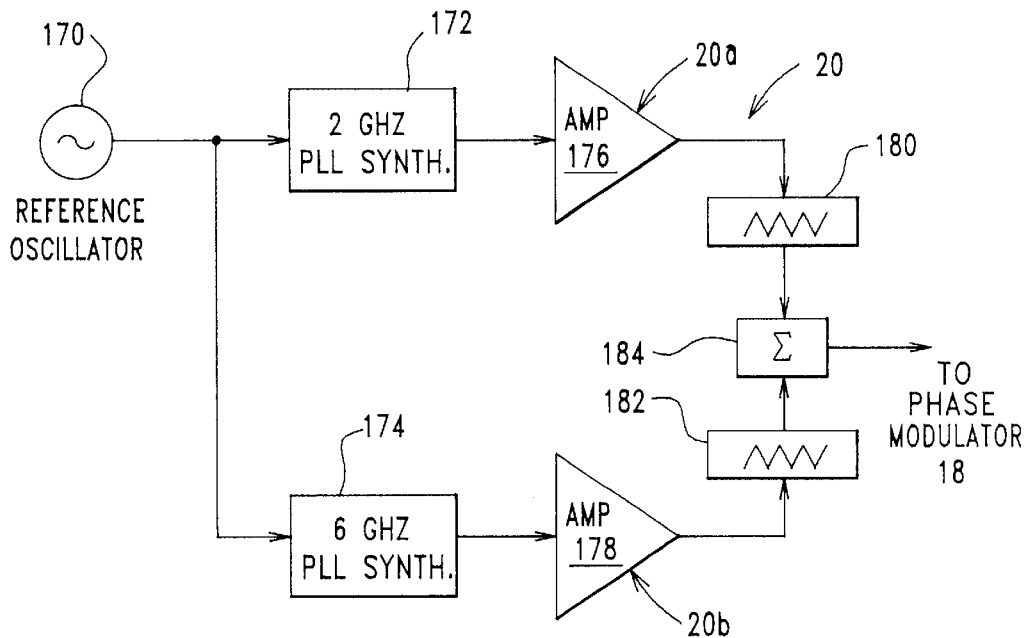
FIG. 4 is a block diagram illustrating a first embodiment of a two-tone generator for use in the optical communication system of FIG. 1.

Attention is now directed to FIG. 4 which illustrates a first embodiment of two-tone generator 20 including 2 GHz generator 20a and 6 GHz generator 20b. A reference oscillator 170 generates a 10 MHz reference signal which is provided to a 2 GHz phase locked loop (hereinafter PLL) synthesizer 172 and to a 6 GHz PLL synthesizer 174. The synthesizers generate their designated output frequencies and provide outputs to amplifiers 176 and 178, as indicated. Amplifiers 176 and 178, in turn, provide outputs to RF attenuators 180 and 182. The attenuators are configured for providing attenuation of the outputs of amplifiers 176 and 178 in steps of less than 0.5 dB. Preferably, attenuation steps of approximately 0.1 dB are provided. Attenuators 180 and 182 provide attenuated outputs to an RF signal combiner 184 which, in turn, provides a combined RF output to phase modulator 18 (see FIG. 1). While two-tone generator 20 may readily be provided by one having ordinary skill in the art, it is important to mention that design practices should be employed wherever possible which ensure a stable output with regard to temperature changes and output drift over time.

Figure 5:
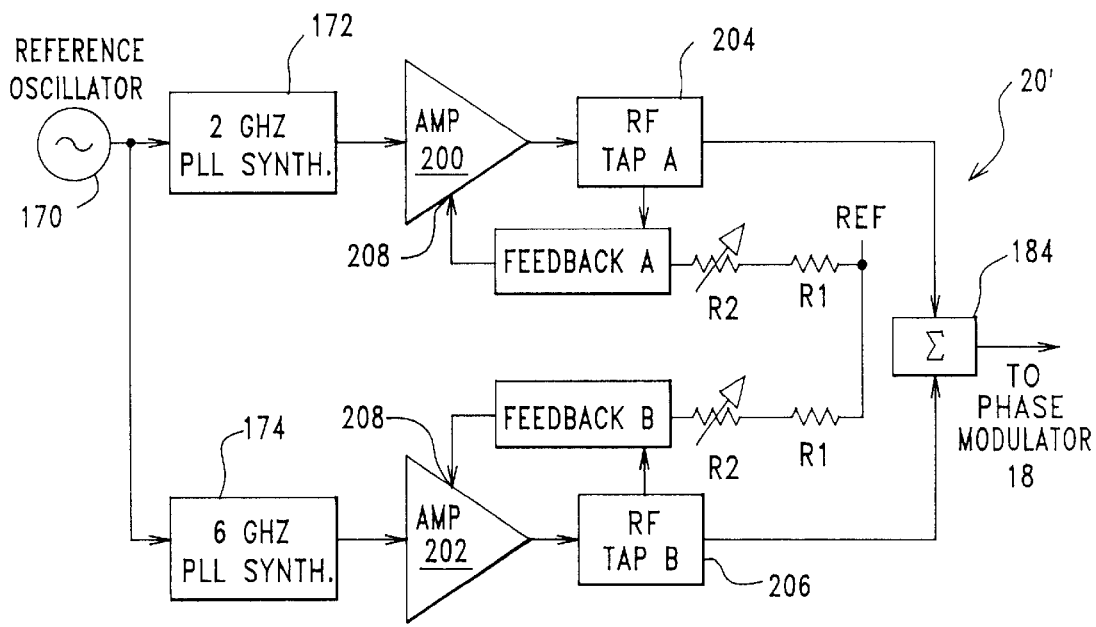
FIG. 5 is a block diagram illustrating a second embodiment of a two-tone generator for use in the optical communication system of FIG. 1.

Turning to FIG. 5, a second embodiment of a two-tone generator is indicated by the reference numeral 20'. Because generator 20' includes certain components used in generator 20, like reference numbers have been applied wherever possible and the reader is referred to previous descriptions of these components. The 2 GHz and 6 GHz tone generators in this second embodiment are referred to by reference numbers 20a' and 20b'. Generator 20' includes reference oscillator 170, 2 GHz PLL synthesizer 172, 6 GHz PLL synthesizer 174 and RF combiner 184. The 2 GHz PLL synthesizer provides an output to an amplifier 200 while the 6 GHz PLL synthesizer provides an output to an amplifier 202. An output of amplifier 200 is provided to an RF tap 204. Similarly, an output of amplifier 202 is provided to an RF tap 206. In accordance with the present invention, feedback modules A and B receive respective portions of the outputs of amplifiers 200 and 202 via the RF taps. Amplifiers 200 and 202 each include a feedback input 208 which is connected with a respective one of the feedback modules. Feedback levels provided to the modules are adjustable using a biasing arrangement which is connected with feedback modules A and B. The biasing arrangement associated with each feedback module includes a resistor R1 connected at one end with a voltage reference designated as "REF" and connected its other end with an variable resistor R2. The latter is, in turn, connected with one of the feedback modules such that varying R2 results in a variable DC bias provided to the feedback module. Outputs provided by RF taps A and B are combined by combiner 184. The combined RF signal is then provided to phase modulator 18 (see FIG. 1).

Still referring to FIG. 5, it should be appreciated that tone generator 20' optimizes the 2 GHz and 6 GHz power levels continuously by tapping off the signal powers after the amplifiers, detecting the amplitude of the signals and comparing them to a fixed pre-determined optimum reference level to generate an error signal that is fed back to the RF amplifiers in order to adjust their gains and, thereby, their output powers. This feedback configuration insures that the 2 GHz and 6 GHz power levels remain substantially constant over temperature and time. Moreover, the output power of each tone generator is variable with a resolution of 0.1 dB or better. It is submitted that the implementation of a tone generator in a feedback configuration is highly advantageous and has not been seen in the present application. A specific implementation of the feedback modules will be described immediately below.

Figure 6:
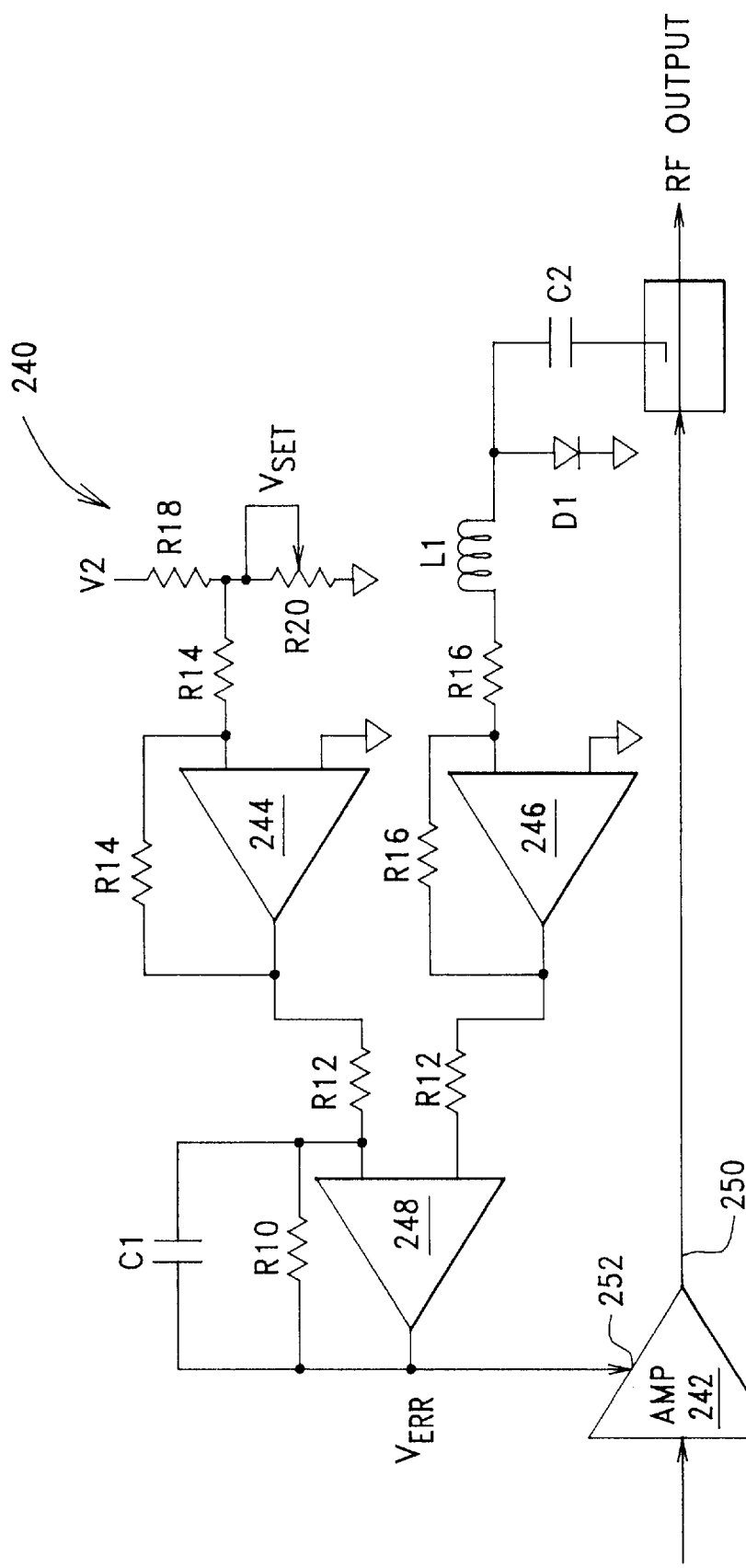
FIG. 6 is a schematic diagram generally illustrating a feedback module for use in the two-tone generator depicted by FIG. 5.

Referring to FIG. 6, a feedback module designed in accordance with the present invention is generally indicated by the reference numeral 240. Feedback module 240 includes an RF amplifier 242, a first buffer amplifier 244, a second buffer amplifier 246 and a comparator amplifier 248. Module 240 further includes an RF detector diode D1 which produces a voltage proportional to the RF level coupled to D1 through C2 as representing a sample of RF output 250 produced by RF amplifier 242. The voltage produced by D1 is filtered through inductor L1 and buffered by second buffer amplifier 246. An adjustable preset voltage, $V_{SET}$, is produced using a reference voltage V2 and a potentiometer R20. $V_{SET}$ is buffered by first buffer amplifier 244. The buffered voltages of the first and second buffer amplifiers are then compared by comparator amplifier 248 to produce an error voltage $V_{ERR}$. The latter is then applied to a gain or output level control 252 of amplifier 242. In this way, the RF power output of amplifier 242 is regulated by the level of $V_{SET}$. Without such regulation, for example, the output of amplifier 242 is assumed to be prone to drift over excursions of temperature, power supply voltages or with aging.

It should be appreciated that the concepts of the present invention, as taught herein, may be applied in a number of different ways by one of ordinary skill in the art. As an example, the teachings of the present invention are equally applicable to any laser implementations which may be developed providing for direct modulation of the laser's output at the tones/frequencies contemplated herein. Therefore, the present examples and method are considered as illustrative and not restrictive, and the invention is not to be limited to the details given herein, but may be modified within the scope of the appended claims.

What is claimed is:

1. A configuration for generating a contour map especially suited for use in optimizing SBS suppression in an optical communication system including means for providing phase modulation of light using first and second tones, the phase modulated light thereafter being coupled into a light guide which exhibits an SBS threshold, said configuration comprising:
   a) a first arrangement for establishing a first phase modulation axis along which phase modulation values of said light are plotted corresponding to phase modulation provided by said first tone and a second phase modulation axis along which phase modulation values of said light are plotted corresponding to phase modulation provided by said second tone; and
   b) a second arrangement for assigning an SBS suppression value to each point within a region defined by the first and second phase modulation axes such that subregions of SBS suppression are identifiable with said region.

2. The configuration of claim 1 wherein said second arrangement is configured for assigning the SBS suppression values within a series of discrete SBS suppression levels.

3. The configuration of claim 2 wherein said series of discrete SBS suppression levels vary by approximately 0.2 dB from a particular level to a next adjacent level.

4. In an optical communication system utilizing dynamic SBS suppression, an arrangement comprising:
   a modulator for phase modulator light generated at a light source for suppression of SBS, said modulation employing multiple tones;
   at least two RIF tone generators for producing said multiple tones at an output power level and for use in providing a combined output thereof to said modulator; and
   a feedback circuit coupled to sample respective output power levels of said tone generators and for controlling said tone generators in a way which stabilizes the output power level of each tone generator.

5. The arrangement of claim 4 wherein each tone generator includes:
   a frequency synthesizer for generating a particular one of said tones, and
   an amplifier coupled to the output of the frequency synthesizer, said amplifier including a gain control input coupled to said feedback circuit to control the gain of the amplifier amplifying the particular tone and thereby the gain of each tone generator.

6. The arrangement of claim 4 wherein a range of output power of each tone determines an operational region of SBS suppression and wherein said feedback circuit is configured for maintaining operation at a selected point within the operational region of SBS suppression.

7. The arrangement of claim 4 wherein the output of each tone generator is coupled to an RF attenuator to provide incremental steps of power level variation to said phase modulator.

8. The arrangement of claim 7 wherein said incremental steps are about 0.1 dB steps of attenuation.

9. In an optical communication system utilizing dynamic SBS suppression, a method comprising the steps of:
   producing at least two tones at selectable output power levels using at least two tone generators;
   combining said tones at the selected output power levels;
   sampling each tone using a feedback circuit;
   controlling said tone generators using the feedback circuit in a way which stabilizes the output power level of each tone generator at least approximately to the selected output power level; and
   phase modulating light generated by a light source using the combined tones for suppression of SBS.

10. The method of claim 9 wherein the step of producing said tones includes the step of synthesizing each tone using a frequency synthesizer and amplifying the synthesized tone responsive to said controlling step.

11. The method of claim 9 wherein a range of output power of each tone determines an operational region of SBS suppression and wherein the controlling step maintains operation at a selected point within the operational region of SBS suppression.

12. The method of claim 9 further comprising the steps of:
   defining a contour map having one axis along which phase modulation provided by a first one of said tones is plotted based on a first output power level range of the first tone and having another axis along which phase modulation provided by a second one of said second tones is plotted based on a second output power level range of the second tone such that an SBS suppression value is indicated for any possible combination of phase modulations of the first and second tones so as to define one or more sub-regions of optimum SBS suppression and wherein said step of controlling the tone generators includes the step of maintaining operation of the system within a selected subregion of said contour map.

13. An optical communication system utilizing dynamic SBS suppression comprising:
   a modulator for phase modulating light generated at a light source, said modulation employing multiple tones;
   at least two RF tone generators for producing said multiple tones and providing a combined output thereof to said modulator;

a feedback circuit coupled to sample respective output power levels of said multiple tone outputs and for determining an operational region of SBS suppression as a function of the respective output power levels by identifying combinations of said power levels at which optimized SBS suppression is achieved; and an arrangement for applying outputs of said feedback circuit to said tone generators to adjust the output power level of each tone generator to achieve optimized SBS suppression in the system.

14. The system of claim 13 further comprising
an amplifier coupled to the output of each of said tone generators; and
a set of outputs of said feedback circuit respectively coupled to control the power level of said amplifiers.

15. The system of claim 13 wherein there are at least two tone generators in the system.

16. The system of claim 13 wherein there are three or more tone generators in the system.

17. The system of claim 13 wherein at least one sub-region is defined in the operational region for establishing at least one point for operation to achieve optimized SBS suppression.

18. The system of claim 13 wherein the output of each of said tone generators is coupled to an RF attenuator to provide incremental steps of attenuation in the output power available from each tone generator.

19. The system of claim 18 wherein said incremental steps are about 0.1 dB steps of attenuation.

20. The system of claim 18 wherein the outputs from said attenuators are combined using an RF signal combiner.

21. In an optical communication system utilizing dynamic SBS suppression, a method comprising the steps of:
producing multiple tones using at least two RIF tone generators;
sampling respective output power levels of said multiple tones using a feedback circuit;
combining said multiple tones;
phase modulating light generated at a light source using the multiple tones;
based on said sampling step, determining an operational region of SBS suppression as a function of the respective output power levels by identifying combinations of said output power levels at which optimized SBS suppression is achieved; and
applying outputs of said feedback circuit to said tone generators to adjust the output power level of each tone generator to achieve optimized SBS suppression in the system.

22. The method of claim 21 wherein the step of producing said tones includes the step of synthesizing each tone using a frequency synthesizer and amplifying the synthesized tone responsive to identification of combinations of the power levels for optimized SBS suppression.

23. The method of claim 21 wherein a range of output power of each tone determines an operational region of SBS suppression and wherein said applying step maintains operation at a selected point within the operational region of SBS suppression.

24. The method of claim 21 further comprising the steps of:
defining a contour map having one axis along which phase modulation provided by a first one of said tones is plotted based on a first output power level range of the first tone and having another axis along which phase modulation provided by a second one of said second tones is plotted based on a second output power level range of the second tone such that an SBS suppression value is indicated for any possible combination of phase modulations of the first and second tones so as to define one or more sub-regions of optimum SBS suppression and wherein said step of controlling the tone generators includes the step of maintaining operation of the system within a selected sub-region of said contour map.

25. The method of claim 21 further comprising the steps of
coupling an amplifier to the output of each of said tone generators; and
connecting outputs of said feedback circuit to control the power level of said amplifiers.

26. The method of claim 21 wherein at least two tones are used.

27. The method of claim 21 wherein at least three or more tones are used.

28. The method system of claim 21 further comprising the step of determining at least one sub-region in the operational region of SBS suppression based on a characteristic of that sub-region.

29. The method of claim 28 further comprising the step of establishing at least one point for operation of the system within said sub-region to achieve optimized SBS suppression.

30. The method of claim 21 including the step of coupling the output of each of said tone generators to an RF attenuator to provide incremental steps of attenuation in the output power available from each tone generator.

31. The method of claim 30 wherein said incremental steps are about 0.1 dB steps of attenuation.

32. The method of claim 21 including the step of combining said tones using an RF signal combiner.

33. For use with an optical communication system utilizing dynamic SBS suppression, and having an optical modulator which is operative to modulate an optical beam in accordance with an RF modulation signal supplied thereto, a method comprising the steps of:
(a) independently generating a first RF tone signal exclusive of a modulated output optical beam produced by said optical modulator;
(b) independently generating a second RF tone signal exclusive of said modulated output optical beam produced by said optical modulator;
(c) comparing a sample of said first RF tone signal generated in step (a) with a prescribed RF tone power level and controllable adjusting the power level of said first RF tone signal to a stabilized first RF tone power level that complies with a selected RF tone power level;
(d) comparing a sample of said second RF tone signal generated in step (a) with a prescribed RF tone power level and controllably adjusting the power level of said second RF tone signal to a stabilized second RF tone power level that complies with said selected RF tone power level;
(e) combining said first and second RF tone signals, power levels of which have been controllably adjusted in steps (c) and (d) respectively, to produce a combined RF tone signal; and
(f) applying said combined RF tone signal produced in step (e) to said optical modulator, so as to cause said optical modulator to modulate said optical beam in accordance with said combined RF tone signal, first and second RF tone signals of which have power levels that comply with said selected RF tone power level.

34. The method according to claim 33, wherein steps (c) and (d) respectively comprise controllably adjusting power levels of said first and second RF tone signals to stabilized first and second RF tone power levels within an operational region of SBS suppression.

35. The method according to claim 33, wherein steps (c) and (d) respectively comprise controllably adjusting power levels of said first and second RF tone signals to stabilized first and second RF tone power levels that optimize SBS suppression.

* * * * *